Figure 1A:
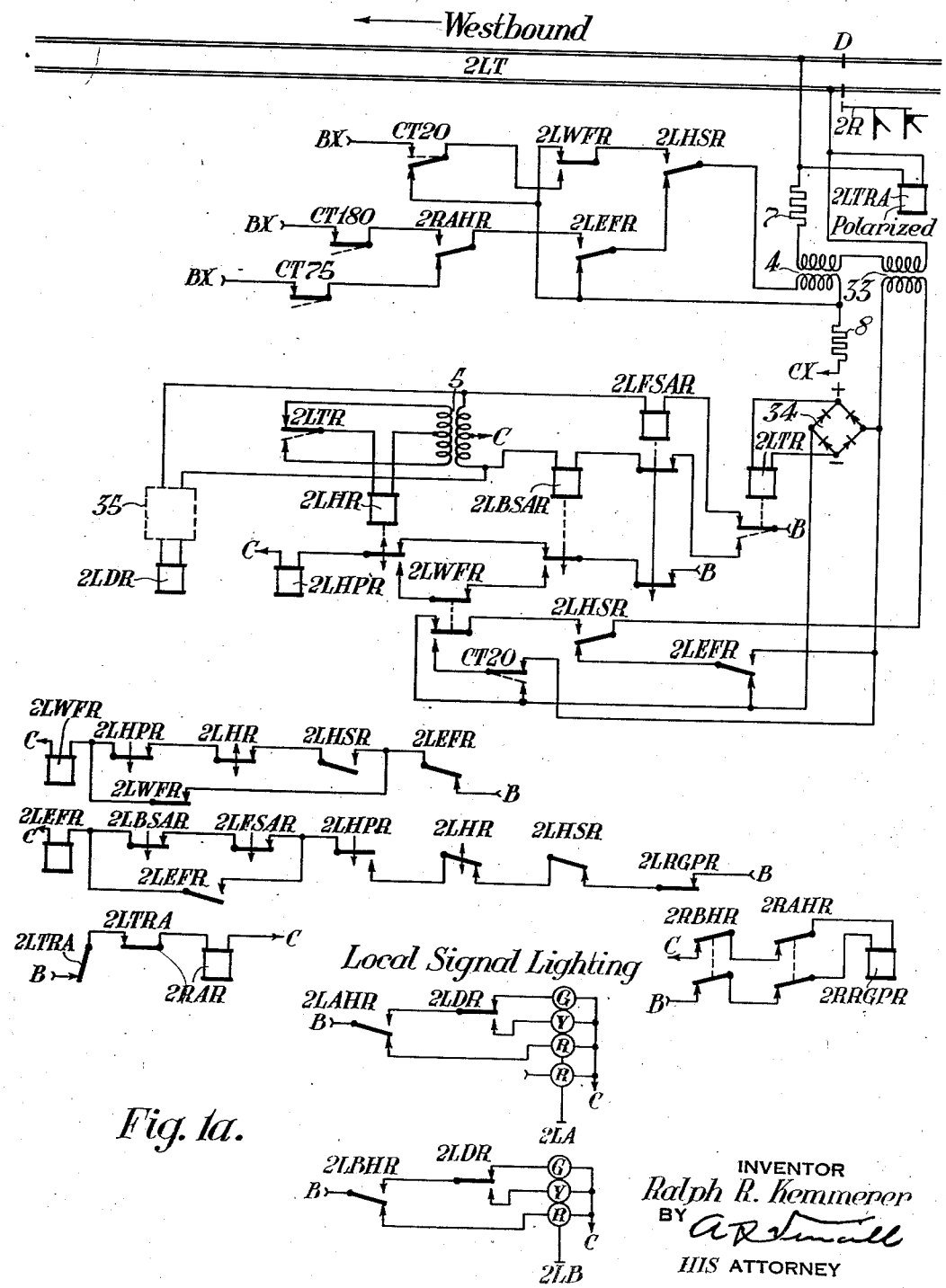

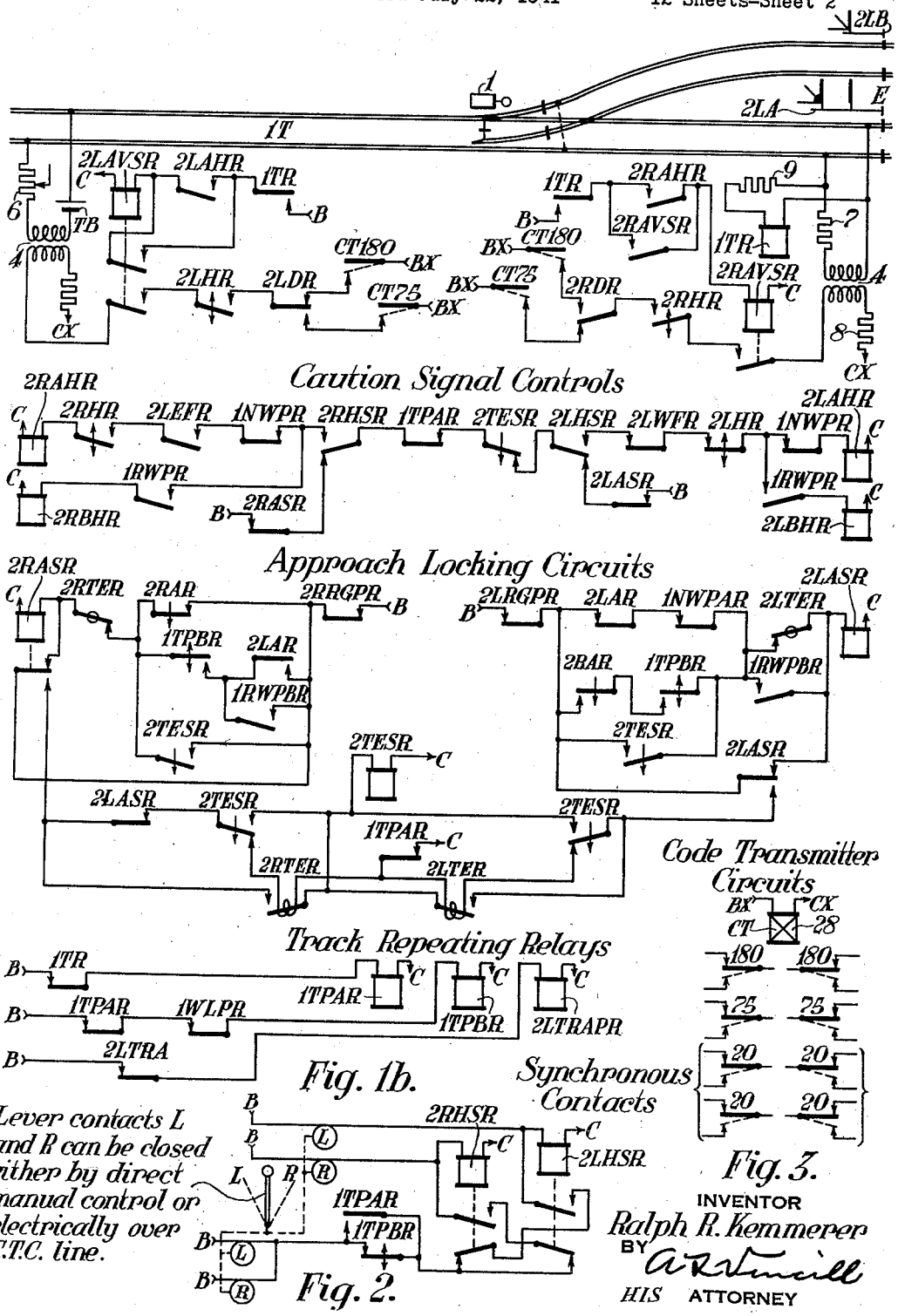

April 20, 1943.  R. R. KEMMERER  2,316,961
RAILWAY TRAFFIC CONTROLLING APPARATUS
Filed July 22, 1941    12 Sheets-Sheet 5
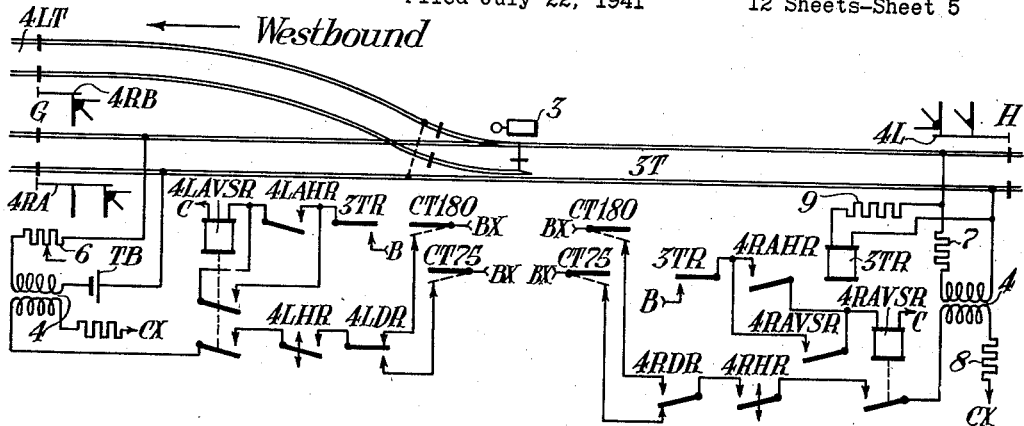
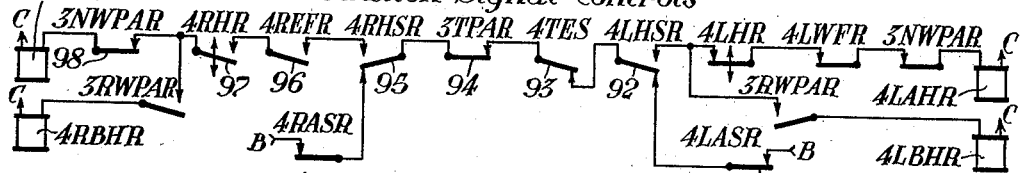
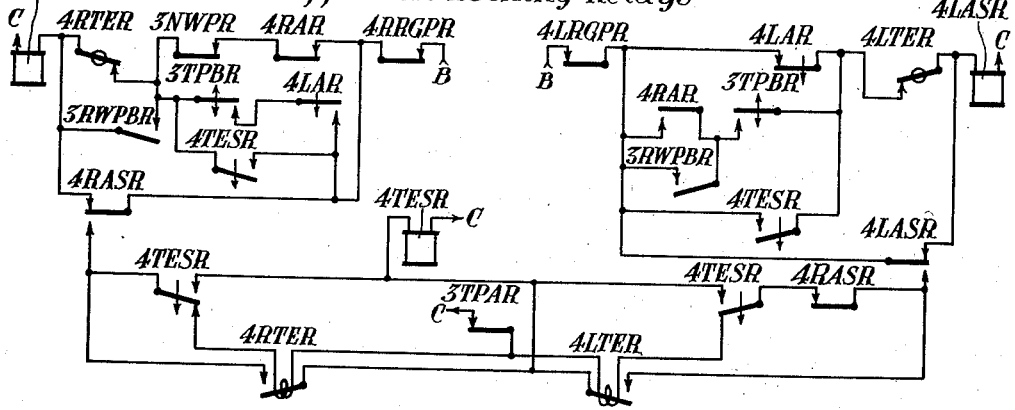
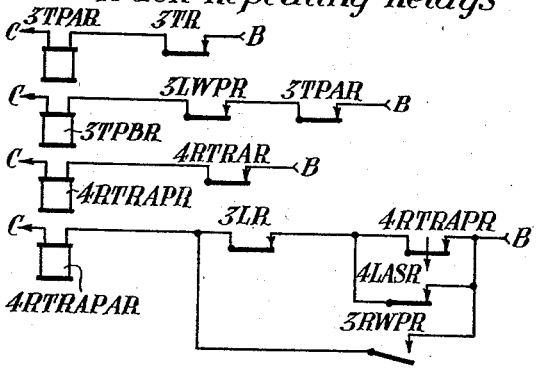
Fig. 1e.
INVENTOR
Ralph R. Kemmerer
BY
HIS ATTORNEY April 20, 1943.   R. R. KEMMERER   2,316,961
RAILWAY TRAFFIC CONTROLLING APPARATUS
Filed July 22, 1941   12 Sheets-Sheet 7

INVENTOR
Ralph R. Kemmerer
BY
HIS ATTORNEY

Patented Apr. 20, 1943

2,316,961

UNITED STATES PATENT OFFICE 2,316,961

RAILWAY TRAFFIC CONTROLLING APPARATUS

Ralph R. Kemmerer, Swissvale, Pa., assignor to The Union Switch & Signal Company, Swissvale, Pa., a corporation of Pennsylvania Application July 22, 1941, Serial No. 403,502

19 Claims. (Cl. 246—3)

My invention relates to railway traffic controlling apparatus and more particularly to a single track, two-direction system of signaling wherein centralized traffic control or other manual control is used to establish traffic direction over the single track stretch, coded track circuits being used to provide control of wayside signals, either with or without cab signal control. A distinguishing feature of my system is that it dispenses with all control line wires except for the C. T. C. coded line circuit if C. T. C. is used, and except for the pair of approach locking line wires between the ends of the passing sidings. The latter pair of line wires is not indispensable and can be omitted if certain alternative approach locking arrangements are used. The present invention is an improvement on the inventions disclosed in the following copending United States applications: Serial No. 370,433 filed by John M. Pelikan on December 17, 1940, now U. S. Patent 2,292,967 granted August 11, 1942; and Serial No. 384,106 filed by Charles B. Shields on March 14, 1941, both for Railway traffic controlling apparatus.

One object of my invention is to provide a coded track circuit system of signaling for traffic moving in either direction on a single track without employing any control line wires for the ordinary signaling functions. Another object of my invention is to make available the usual alternating current frequency code in a system of the above character for controlling the signaling functions. A further object of my invention is to introduce into a system of this character the safety and checking features which make the safety and reliability of the system comparable to coded A. P. B. systems employing control line wires. Other objects, purposes and features of my invention will be apparent from the description which follows.

I accomplish the foregoing objects by: employing normally coded alternating current track circuits which are reversible under the control of associated apparatus which, in turn, is governed from a centralized traffic control machine or other control unit by the train dispatcher or operator in charge thereof; employing novel means for establishing the authorized direction of traffic over the single track between passing sidings and between ends of each passing siding such that this selection of traffic direction causes all wayside signals (and cab signals, if used) which oppose the established traffic direction to display their most restrictive indications until such time as the traffic direction is properly changed; providing a check that all track circuits between opposing signals are unoccupied before permitting a traffic reversal; providing a continuous check that the opposing absolute signal or signals governing over the route are retained in their most restrictive position; causing the intermediate signals to display proceed indications consistent with traffic conditions ahead in the direction authorized, prior to the final clearing of the absolute signal which governs traffic movement in that direction, this being accomplished by continuously coded track circuit control; employing novel means for retaining the last-established route against opposing moves after that route is accepted by a train; providing novel means for permitting the reversal of traffic before the "OS" section at the exit end of the route is vacated, thus facilitating non-stop meets and expediting traffic movements; and providing a novel arrangement of neutral and polarized direct current track circuits superimposed upon the normally coded alternating current track circuits for the control of certain approach circuits which do not enter directly into the control of signals but provide the usual approach locking of controlled switches and which may be used for the further purpose of providing control of visual or audible indications of train movements to the dispatcher or operator.

Since no line wires are required for the control of signals or for the control of traffic direction, the possible influences of crosses, grounds and other irregularities common to line wire controlled systems are eliminated so that it is unnecessary to provide protection against such faults. An additional advantage is that "back lock" circuits to the "distant" signals are not required because, since the control of these signals is by code, the application of the control code to the exit end of the block can be guaranteed by including a back contact of the control relay in the "back lock" circuit at the "home" signal. By feeding the proper code to the track circuit, the distant signal will automatically display the correct aspect.

In the system herein described, I make use of the usual 75 and 180 per minute proceed codes which provide a three-indication system, it being understood that these code rates are illustrative only and that other code rates, and either more or fewer codes may be used, depending on the operating requirements of the particular railroad system. I also make use of a "slow" or checking code which may consist of alternating current interrupted at a rate substantially lower than that of the slowest (75 per minute) signal control code such, for example, as 20 times per minute.

Before describing the system in detail, and in order to make the subsequent description more readily understandable, I shall first briefly summarize the salient operation which is involved. I accomplish the reversal of traffic direction by selectively energizing an "HSR" relay for the entering headblock signal, this selective energization being conveniently accomplished in well-known manner either over a suitable coded centralized traffic control line extending throughout the stretch, such control being indicated, for example, in Figs. 1e and 1l of the drawings, or by any other suitable means such as a manually controlled relay or lever contact, one form of such control being shown in Fig. 2 of Sheet 2. It will be understood that all of the RHSR and LHSR relays for the stretch can, and generally will, be controlled over a coded line circuit from a central C. T. C. control station. The selection circuits for energizing a particular one or group of these relays, and the protective circuits involved in such selection form no part of my invention and are well known in C. T. C. signaling. Accordingly, these circuits have not been shown in order to simplify the disclosure. Energization of an HSR relay for the desired traffic direction initiates the feeding of the "slow" or 20 code progressively from one end of the stretch by a cascading action over the track circuits throughout the section (if unoccupied) up to the opposing headblock signal. This 20 code checks the unoccupied condition of the intervening track circuits, places the opposing intermediate signals at stop, checks that the opposing headblock signal is at stop, and finally energizes a traffic locking relay "FR" at the remote end of the section. When this traffic relay is energized, impulses of a proceed code are fed during each "off" interval of the 20 code, first to the most remote normally coded track circuit, and then progressively over the intervening track circuits by a cascading action, to the first normally coded track circuit at the entering end. The proceed code clears each block in turn until finally all intervening signals for the desired direction are displaying a proceed indication. It will be understood that the first block will receive 75 code and the succeeding blocks will receive 180 code. The entering headblock signal will now be permitted to display a proceed indication so that the train may enter the single track stretch.

I shall describe one form of apparatus embodying my invention, and shall then point out the novel features thereof in claims.

Figs. 1a to 1l, inclusive, of the accompanying drawings when placed end to end with Fig. 1a at the left, are a diagrammatic view showing a single track, two-direction signaling system embodying my invention. Fig. 2 of Sheet 2 shows the usual form of manual lever control for the direction selecting relays. Fig. 3 of Sheet 2 shows synchronous operation of the 20 code contacts of a code transmitter and shows the usual 75 and 180 code contacts of this device.

Similar reference characters refer to similar parts throughout the system disclosed in the several sheets of the drawings.

In order to make the operation more easy to follow, I shall first describe briefly some of the apparatus which enters into the operation, describing later the manner in which the system functions as a whole.

Referring to Figs. 1a-1l of the drawings, the stretch of track shown therein is divided into track circuit sections by means of the usual insulated rail joints at locations D, E, F, G, . . . O. Locations D, E, G, H, J, L, N, and O are signal locations whereas F, I, K, and M are cut section locations. As shown, each block in the stretch includes at least two track circuits, but this number may be either increased or decreased, as required by operating conditions.

In any normally coded track circuit control scheme, it is obvious that the coded track circuit energy which is used for the control of the wayside or cab signal must be fed into the track circuit at the exit end thereof. It is apparent, therefore, that if normally coded track circuits are used on single track for the control of two-direction signaling, the coded track circuit feed must be reversible. For this reason, it will be noted that I employ a code feeding transformer 4 connected across the rails at each end of every track circuit. At most of the locations, I connect a track relay transformer 33 in series with the code feed transformer. Looking at the left-hand end of track circuit 4LT of Fig. 1d, for example, the code feed transformer 4 is connected on the input side in series with the relay transformer 33, the latter serving to energize the direct current code following track relay 4LATR through the rectifier 34. It is obvious that the rectifier and direct current track relay combination can be replaced by an alternating current code following track relay, but I prefer to employ a direct current relay because of its more simple construction.

At certain locations, I include a limiting resistor 7 in series with transformers 33 and 4 and connect a neutral direct current track relay 2LATRAR (see Fig. 1d) or a polarized direct current track relay 2LTRA (see location D of Fig. 1a) across the track rails for a purpose to be described hereinafter. At certain other locations and at the remote end of the track circuits having the direct current track relays such as 2LATRAR or 2LTRA, I connect a track battery TB having a limiting resistor 6 in series therewith. Current from this track battery is supplied to the track over contacts of a direct current repeater relay 2LATRAPR at cut sections (see location F of Fig. 1c), or over contacts of a direct current repeater relay 12TRAPR at signal locations (see location J of Fig. 1g), these repeaters being controlled by the direct current track relay at that location. The track battery current is at times pole-changed by the associated repeater to provide polarized track circuit control, as will be pointed out hereinafter. For the present, it is sufficient to state that these direct current track circuits in my system provide the approach locking control.

Normally, when coded alternating current track circuit energy is being supplied to the rails, the track transformer 4 has one terminal of its primary winding connected through contacts of associated selecting relays to a coding contact of a code transmitter 28 (shown in Fig. 3), thence to one terminal BX of a source of alternating current, the remaining terminal of the primary winding being connected to the other terminal CX of the source. While code is thus being supplied, the relay transformer 33 at the same location will have its secondary winding short-circuited in order to reduce the impedance of its primary winding so as to aid the supply of current from the coding transformer in series therewith.

Figure 1C:
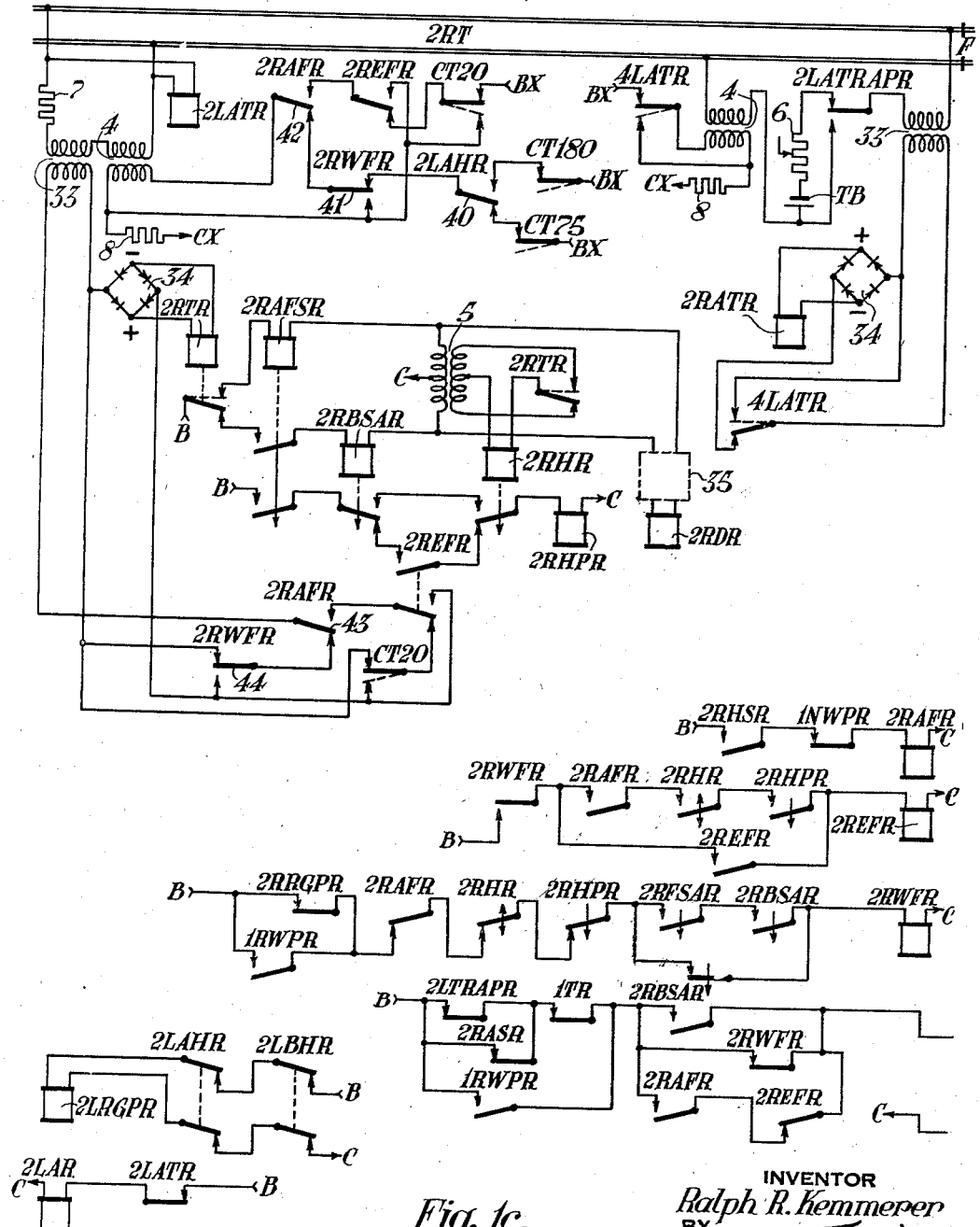
Figure 1D:
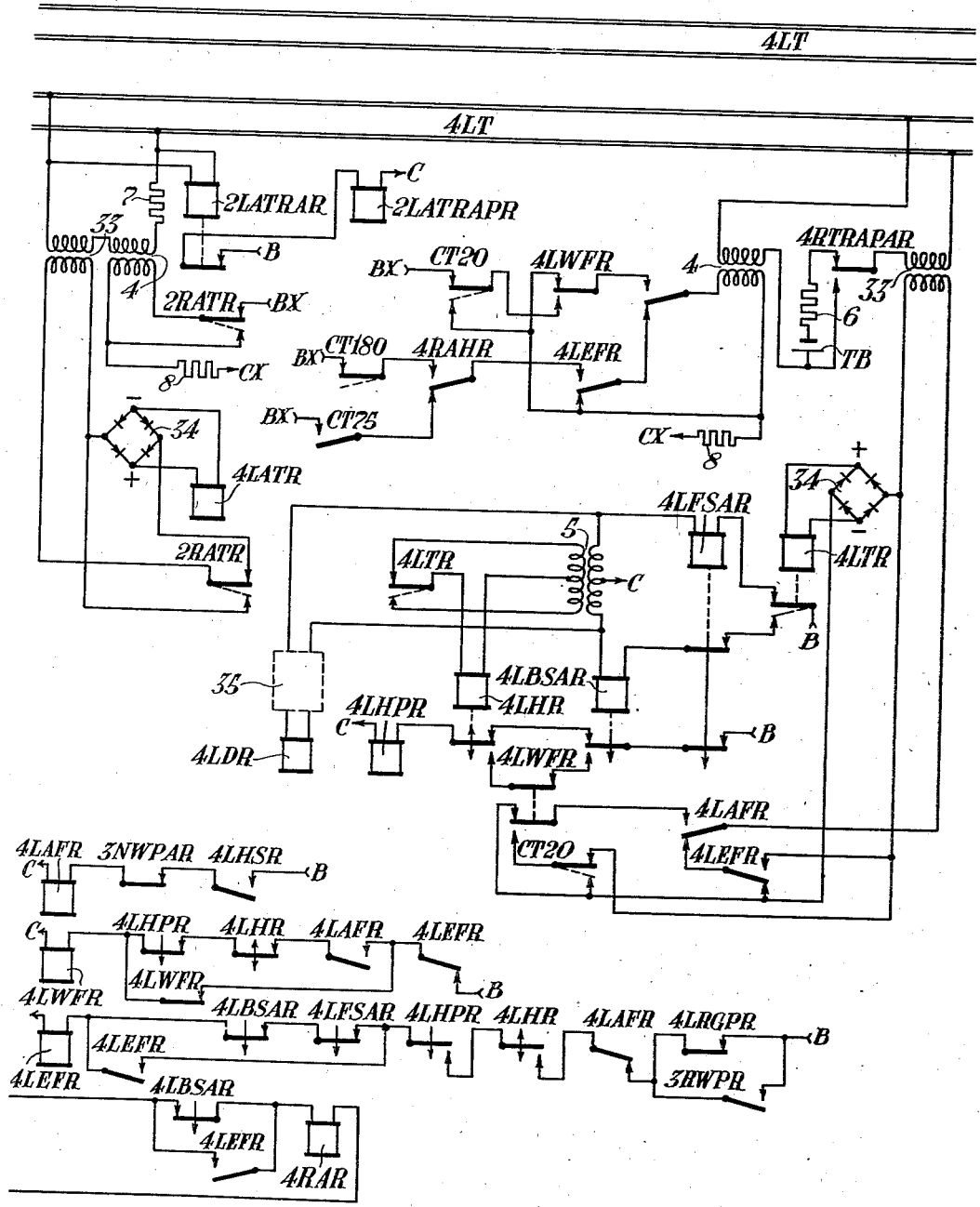
Figure 1F:
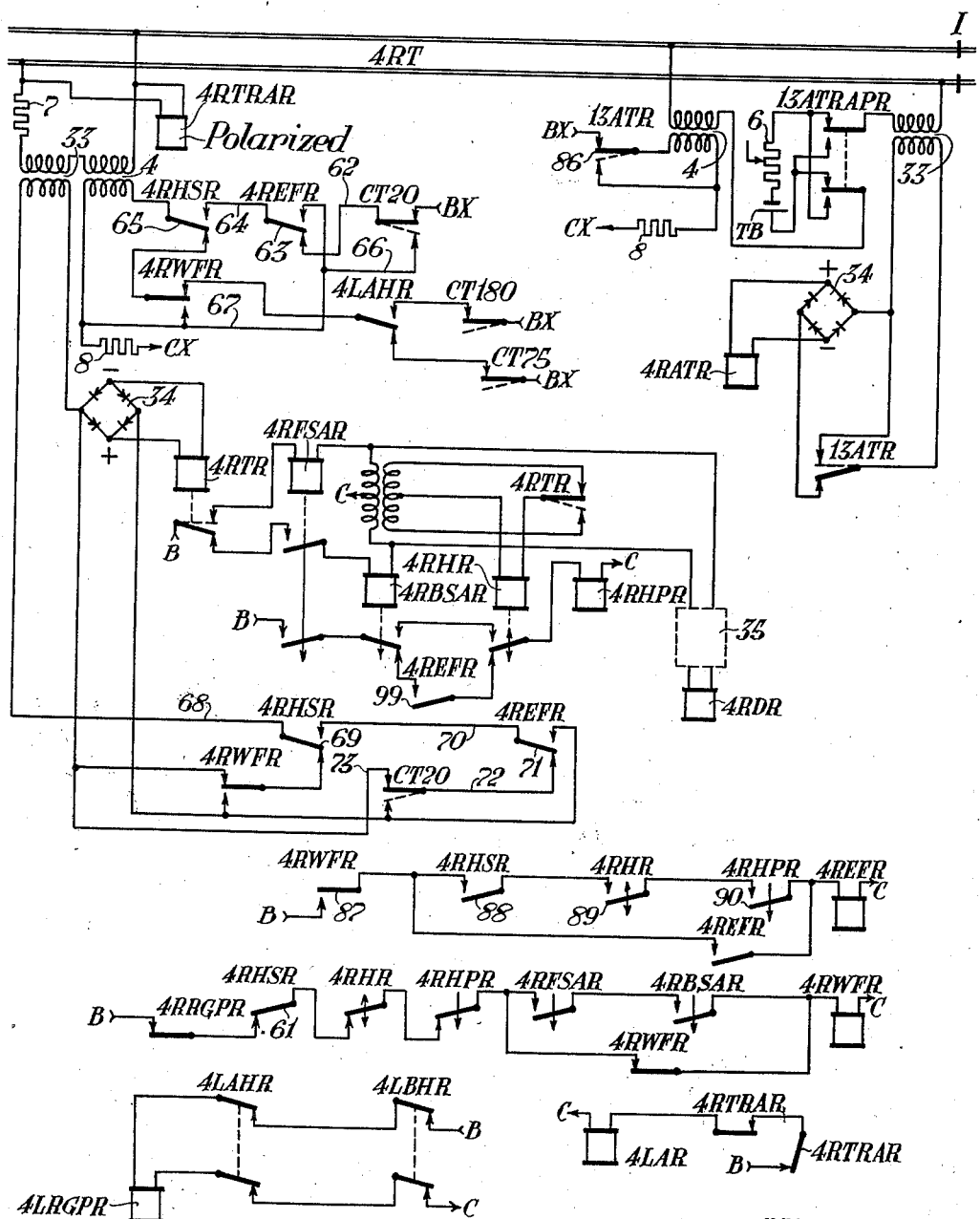

Looking at the track apparatus of Fig. 1c, it is seen that the code supply transformer 4 at the left-hand end of the track is receiving 75 code over a circuit which may be traced from one terminal BX of a source of alternating current, periodically operating contact CT75 of the code transmitter 28 (shown in Fig. 3), back point of contact 40 of relay 2LAHR which is the home relay for signal 2LA, front point of contact 41 of relay 2RWFR, back point of contact 42 of relay 2RAFR, input winding of transformer 4, and limiting resistor 8, to the other terminal CX of the source. The function of resistor 8 is to eliminate the possibility of a flashover at the 20 code contact CT20 of the code transmitter, through placing of a momentary short-circuit on the source BX—CX. At the same time, the output winding of the relay transformer 33 is short-circuited over a circuit which includes the back point of contact 43 of relay 2RAFR and the front point of contact 44 of relay 2RWFR.

In the illustration just given, the coded energy is being fed from left to right, that is toward a westbound train. If the coded track circuit energy is being fed in the opposite direction, toward an eastbound train, then the code feeding transformer 4 just referred to will have its primary winding short-circuited and the relay transformer 33 will be effective for energizing the full-wave rectifier 34 which feeds the code following track relay 2RTR.

In the system which I have shown, I make use of neutral direct current detector track circuits superimposed upon the coded alternating current track circuits and controlled in the usual and well-known manner by "VS" or approach relays which form no part of my invention and so will not be described in detail. The necessary steps involved in the application of code for an approaching train will, however, be described. The detector track circuits serve the usual purpose of enabling the C. T. C. operator (by means of indication codes) to know the location of trains and in addition, by pole changing the polarized direct current track circuits which are superimposed on the alternating current track circuits of the approach sections, means are provided for flexible approach locking of switches, overlap control at the ends of the sidings, and control of the usual visible or audible indications of train movement desired by the C. T. C. operator. Since the indication schemes are well known, they have not been shown or described. The approach locking circuits, except for the manner in which the approach locking is initiated, will also be clear from the drawings, without detailed description, since these involve the usual approach stick relays ASR, normal and reverse track switch contacts NWPAR and RWPBR, respectively, time element stick relay TESR, and the time element release relays TER, all of which are well known.

With respect to initiation of the approach locking, it will be sufficient to state that this is accomplished for certain train movements by virtue of the polarization of the track circuits of the approach sections such as 2LT and 4RT. Considering the siding spanning stretch of Figs. 1b–1e between these two approach sections and assuming that a westbound train has entered section 12T beyond location K (Fig. 1h), the release of track relay 12TRAR will release the repeater relay 12TRAPR, thus opening the direct current feed for track circuit 13T at location J and releasing relays 13ATRAR and 13ATRAPR. If additional neutral direct current track circuits are present between sections 12T and 4RT, all of these will be progressively deenergized by a cascading action initiated through the occupancy of section 12T by the westbound train. Since the track circuit for the approach section 4RT is polarized, the cascading action will stop at this track section, the release of relay 13ATRAPR being effective, however, for pole changing the feed for section 4RT at location I, thus causing the track relay 4RTRAR to reverse but to remain energized so that its neutral contacts are closed. This reversal of relay 4RTRAR opens the normally closed polar contact in the energizing circuit of approach relay 4LAR (shown at bottom of Fig. 1f) so that this relay releases, thus preventing relay 4LASR (Fig. 1e) from becoming reenergized (in case this relay had been released due to signal 4L having been cleared) until the expiration of the usual time interval involved in the release of approach locking. Switch 3 will now remain locked.

It is apparent, therefore, that the polarization of the approach track circuit 4RT prevents the cascading action from extending into the siding spanning section until such time as the train enters section 4RT. Without this provision, this action would extend into the siding spanning stretch with the entry of the train into section 12T, thus undesirably prolonging the time during which the approach locking for the track switch 1 would be effective. When the westbound train enters section 4RT and releases relay 4RTRAR, the cascading action will be transmitted to sections 4LT and TRT by virtue of the release of relays 4RTRAPR and 4RTRAPAR (see bottom of Fig. 1e), the latter relay having a front contact in the direct current track feed for section 4LT at location G. Relay 4LASR in the alternate circuit for relay 4RTRAPAR will be released at this time since signal 4L is at clear for the westbound train. The deenergization of section 2RT will lock the track switch 1.

Considering now that the siding spanning stretch is vacant and that an eastbound train has entered the approach section 2LT, the release of track relay 2LTRA will release the track repeating relay 2LTRAPR (see bottom of Fig. 1b) and will open the line circuit for approach relay 4RAR (Fig. 1d), deenergizing this relay which prevents the approach stick relay 4RASR from becoming reenergized until the expiration of the usual time interval. It will now be apparent that I have accomplished the approach locking under certain traffic conditions by polarizing the approach track sections, and under other traffic conditions by controlling the approach relay over a line circuit. The approach locking by means of a polarized approach track section (9LT) for an eastbound train moving beyond location K will be clear from the foregoing description.

With the apparatus in the condition shown in the drawings, the established traffic direction is westbound. I shall now describe the steps involved in a reversal of the traffic direction from westbound to eastbound between signals 4R and 9L at locations G and O, respectively, and the clearing of the various signals for a move in the eastbound direction.

As shown, all of the track circuits between signals 4L and 9R (locations H and N, respectively) are conditioned for being fed proceed codes at the left-hand or exit end of each track circuit since traffic is now set up for a westbound movement. Track circuit 4RT is being fed 75 code, since signal 4L is at stop. The cut section code following track relay 4RATR receives this code and relays it into the adjoining track circuit 13T, by virtue of the inclusion of contact 45 of relay 4RATR in the input circuit of the code feed transformer 4 at the left-hand end in Fig. 1g. Track relay 13TR receives this code and its contact 46 follows the impulses thereof. At this point, an understanding of the decoding circuits is advantageous and I shall now explain the decoding method in conjunction with the operation of relay 13TR of Fig. 1g.

Except for the introduction of 20 code and the selective operation of the "H" or home relay 13HR in response to the presence of this code, the decoding circuit which I employ is of the usual and well-known type. That is to say, the "FSA" and "BSA" relays check the coding operation of the front point and back point, respectively, of contact 46 of relay 13TR and these relays (13RSAR and 13BSAR) are connected alternately in series with one and then the other half of the input winding of the decoding transformer 5. Relays 13FSAR and 13BSAR have a sufficiently long release interval to remain picked up on 20 code and all higher codes. Relay 13HR is connected alternately to one and to the other half of the output winding of transformer 5, over the rectifying contact 47 of relay 13TR which mechanically rectifies the input to relay 13HR. This relay is so designed as to remain energized on 75 code and higher codes, but to become deenergized on 20 code. The "D" relay 13DR is energized from a conventional tuned decoding unit 35 shown diagrammatically as a rectangle, for simplicity, and is picked up on 180 code only.

Figure 1G:
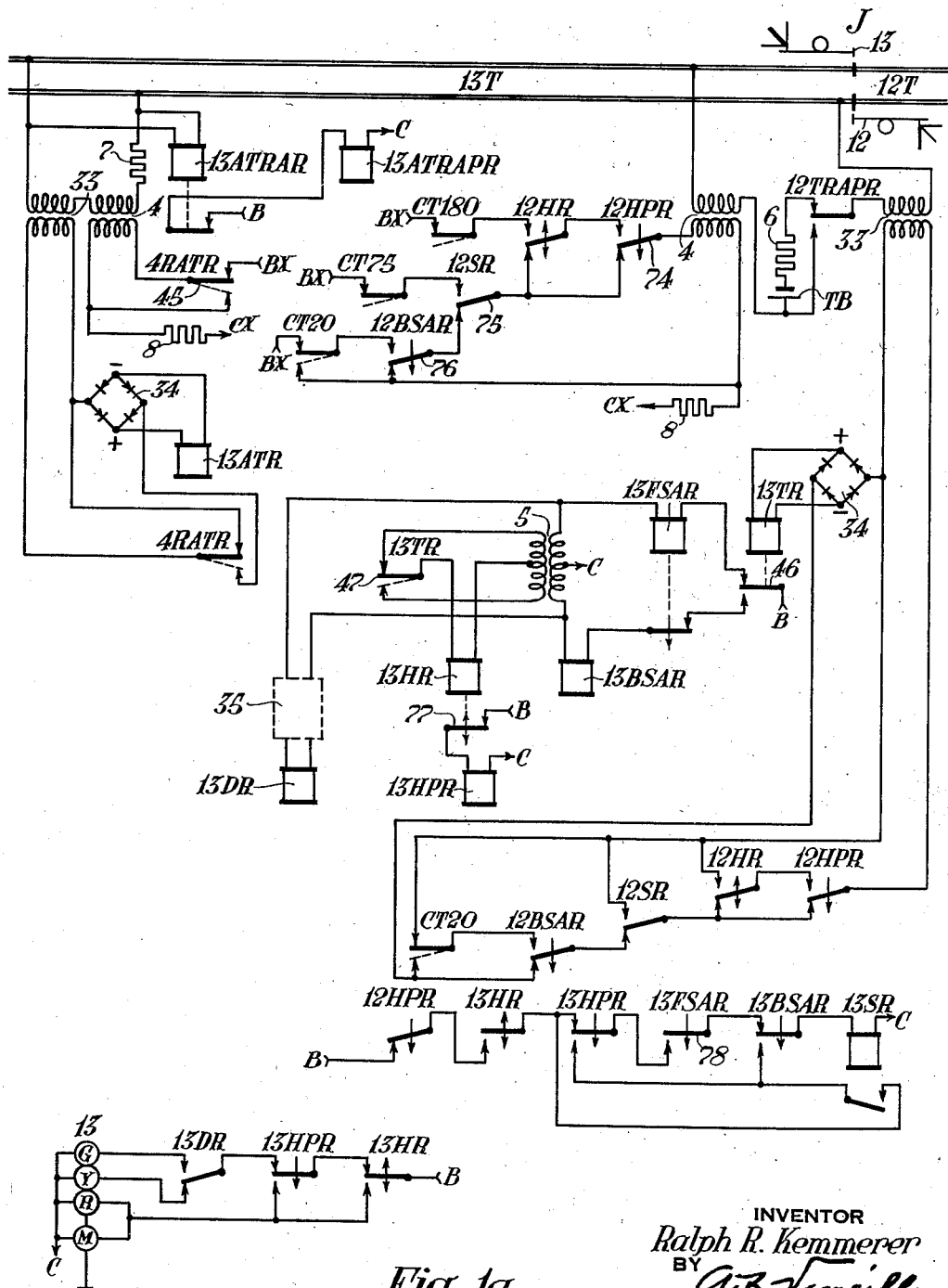
Figure 1H:
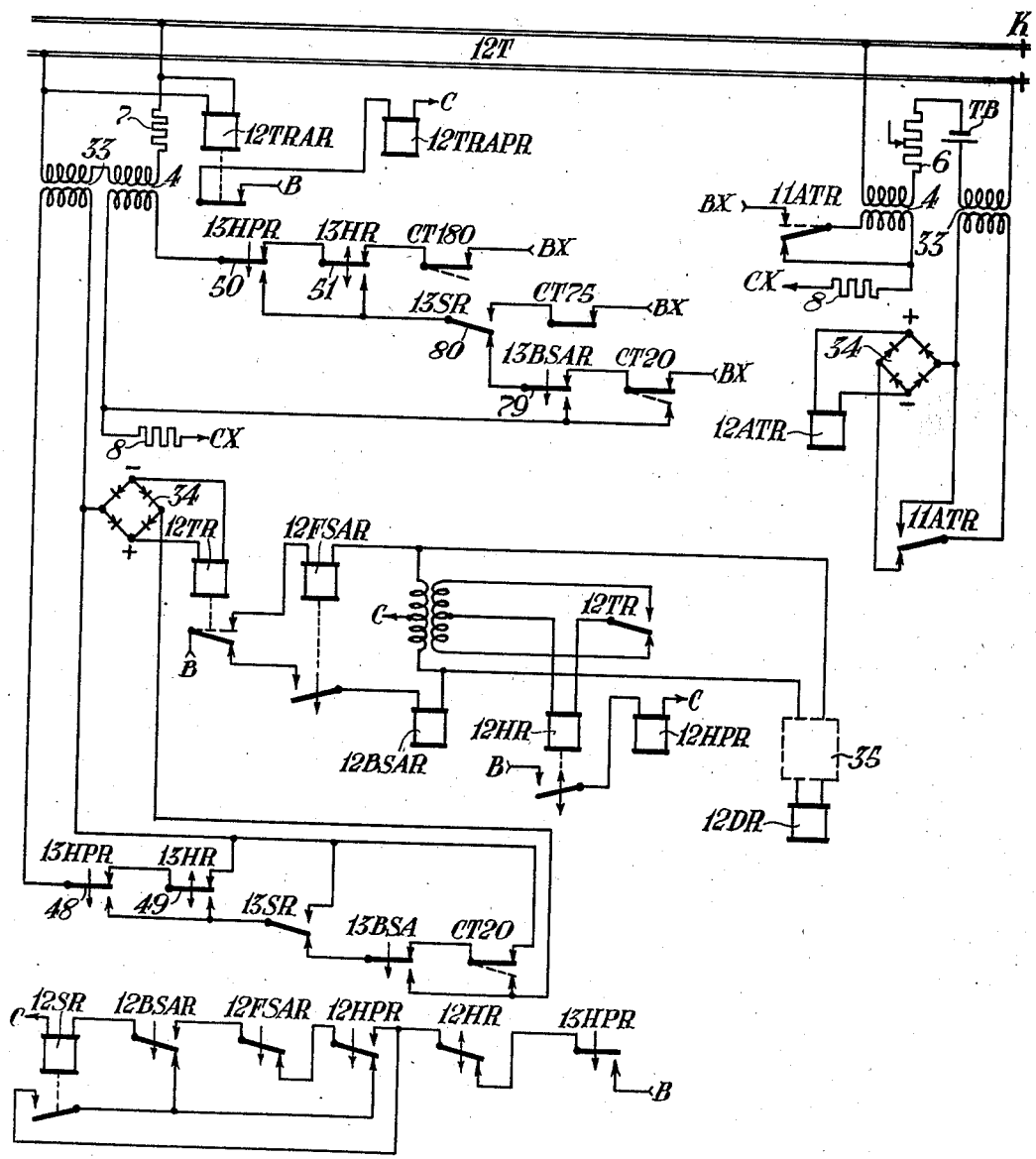
Figure 1I:
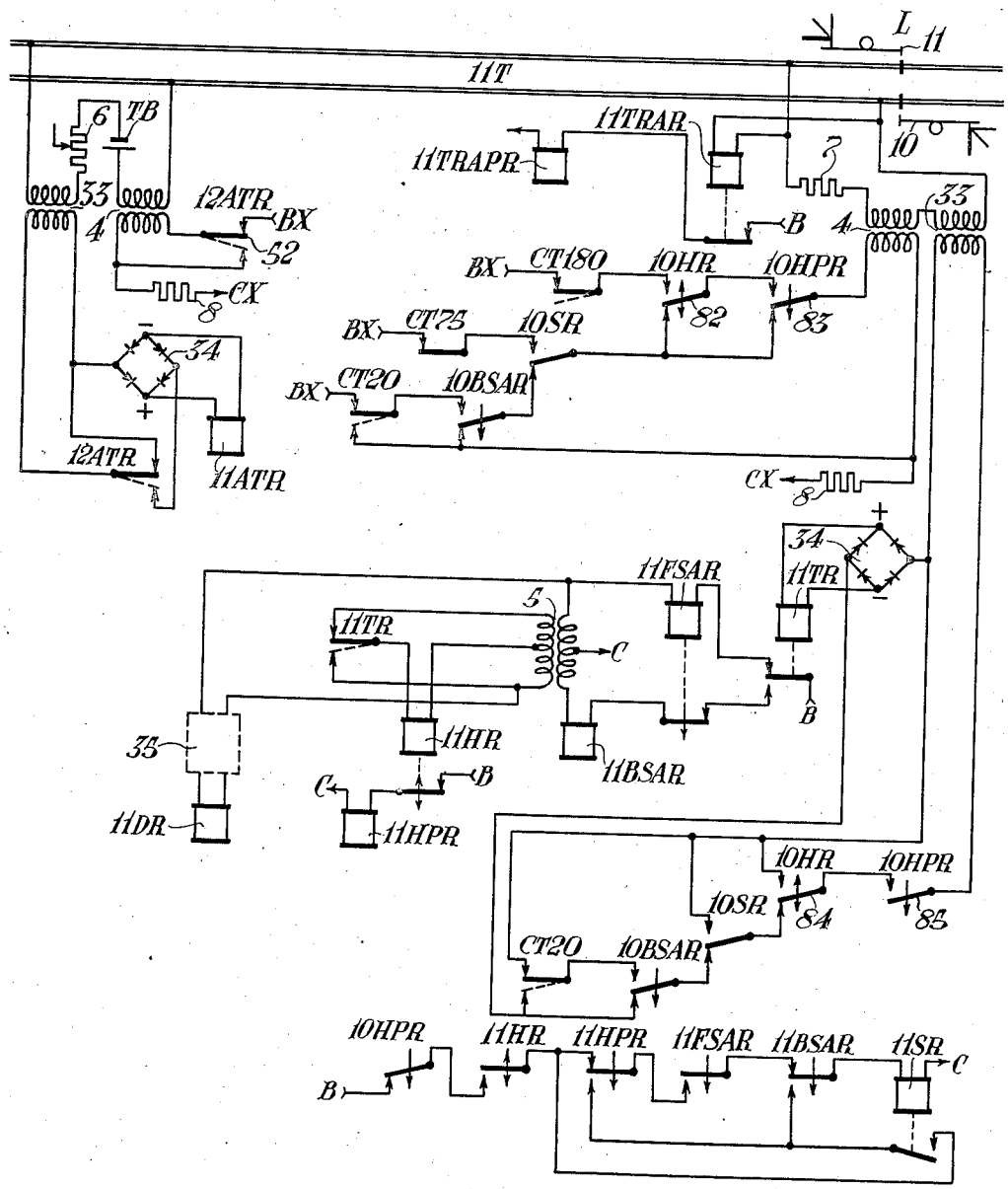
Figure 1J:
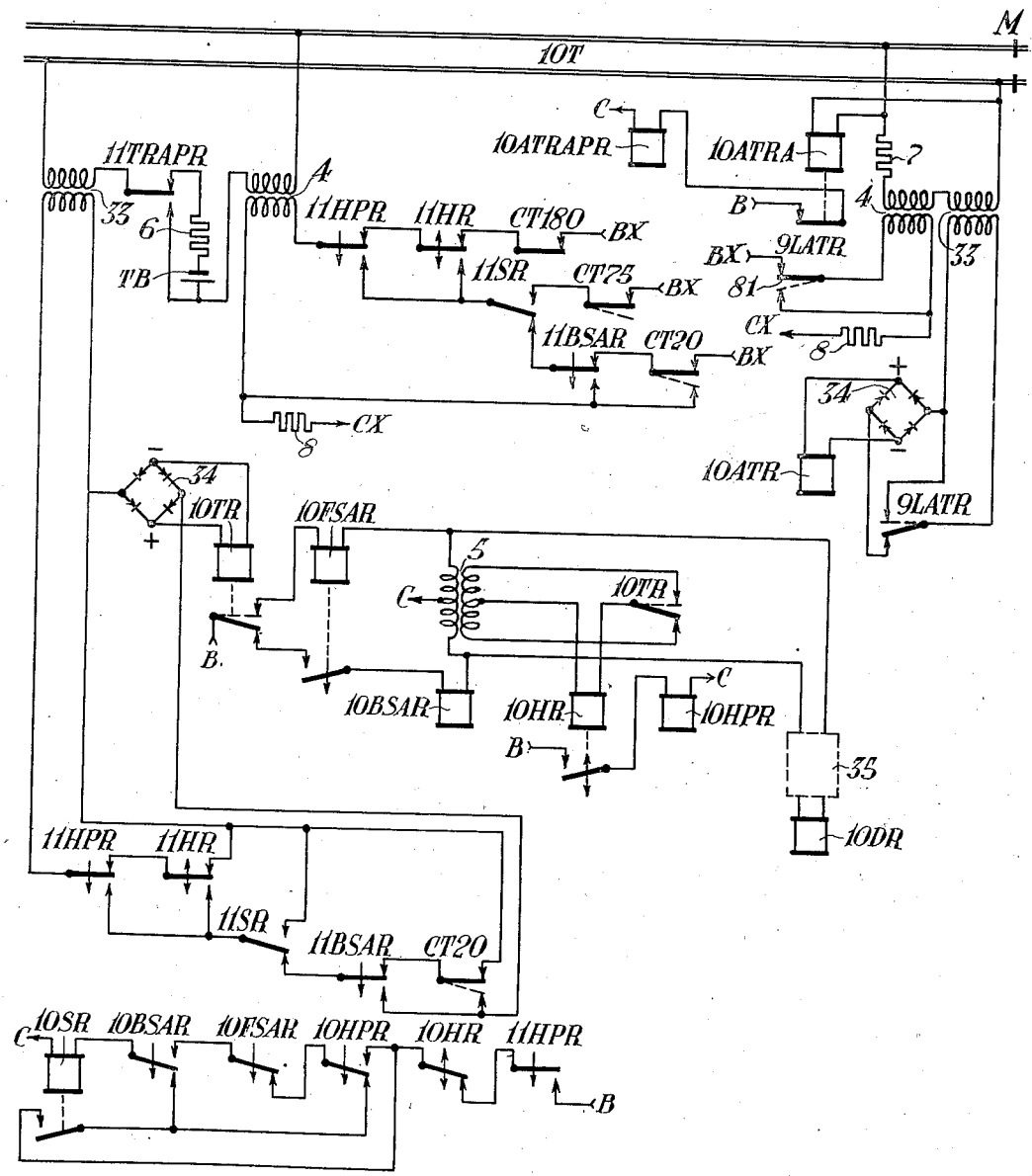

Since, as has been assumed, track relay 13TR is following 75 code, the relays 13FSAR, 13BSAR, 13HR, and the "H" relay repeater 13HPR are all energized, but the 180 code relay 13DR and stick relay 13SR are both deenergized. Since signal 12 is an eastbound signal and since traffic is still established for a westbound move, all of the corresponding relays such as 12FSAR, 12BSAR, etc., of Fig. 1h, are deenergized. It will be noted that the rectifier 34 which feeds relay 12TR is disconnected from the relay transformer 33 and that the output winding of this transformer is short-circuited over the front contacts 48 and 49 of relays 13HPR and 13HR. Accordingly, all of the relays associated with relay 12TR are deenergized. Similarly, since eastbound signal 10 at location L is at stop, relay 10TR is deenergized so that all of its associated relays are released.

Returning for a moment to track circuit 12T, since westbound signal 13 is displaying an approach indication, this track circuit is supplied with 180 code over the front contacts 50 and 51 of relays 13HPR and 13HR. Relay 12ATR receives this code and relays it over contact 52 into the track circuit 11T, whereupon relay 11TR follows 180 code and causes signal 11 to clear, since relays 11FSAR, 11BSAR, 11HR, 11HPR and 11DR will all be energized. Relay 11SR will be deenergized under this condition. In a manner similar to that just described, 180 code is fed to track circuit 10T and is relayed beyond the cut section at location M, into the last normally coded track circuit 9LT so that relay 9LTR follows 180 code and causes the decoding relay group 9LFSAR, 9LBSAR, 9LHR, 9LHPR, and 9LDR to become energized. Signal 9LA is, however, displaying its most restrictive indication because of the deenergization of the C. T. C. controlled 9LHSR relay and the caution signal control relay 9LAHR.

Figure 1K:
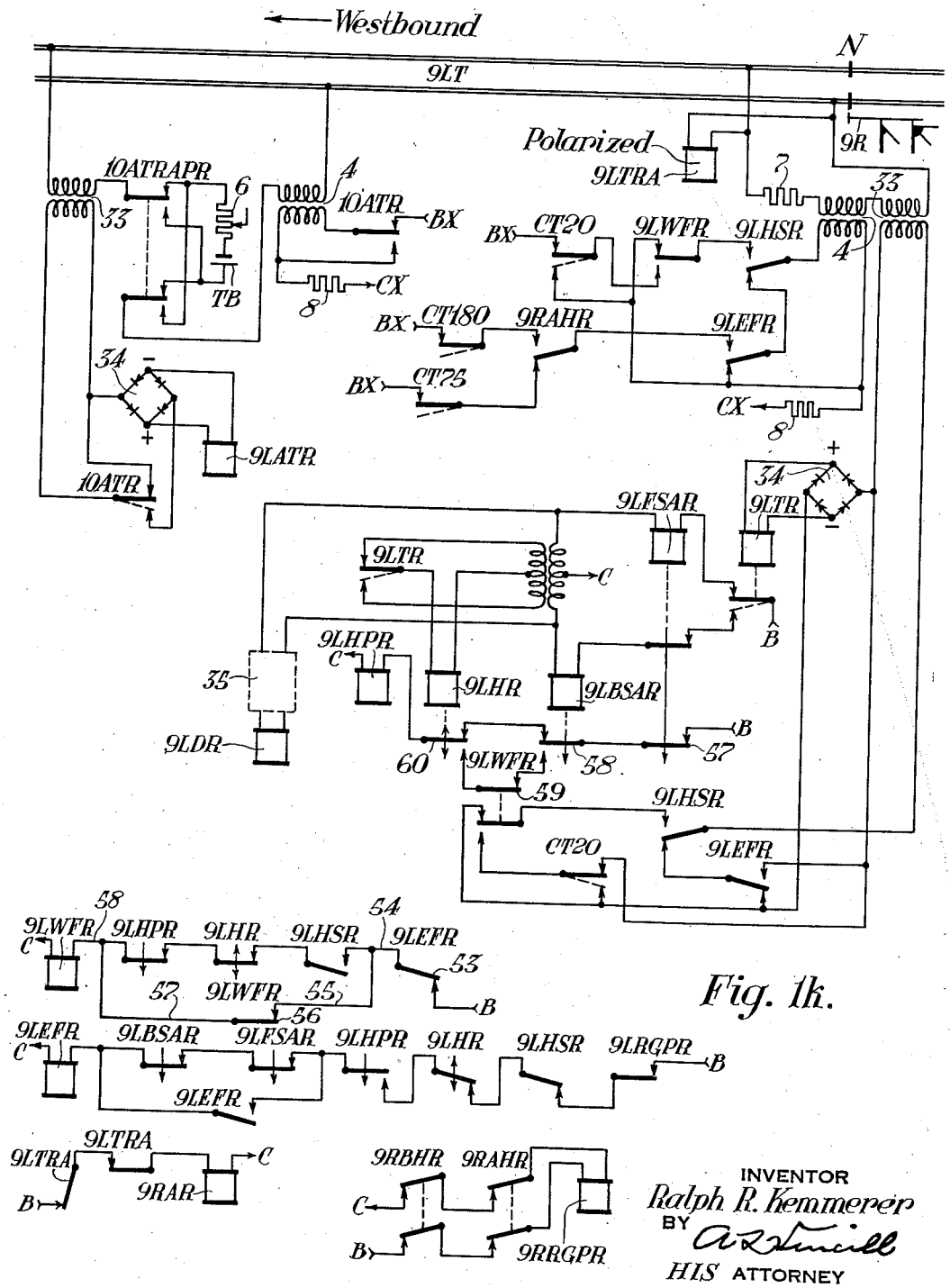
Figure 11:
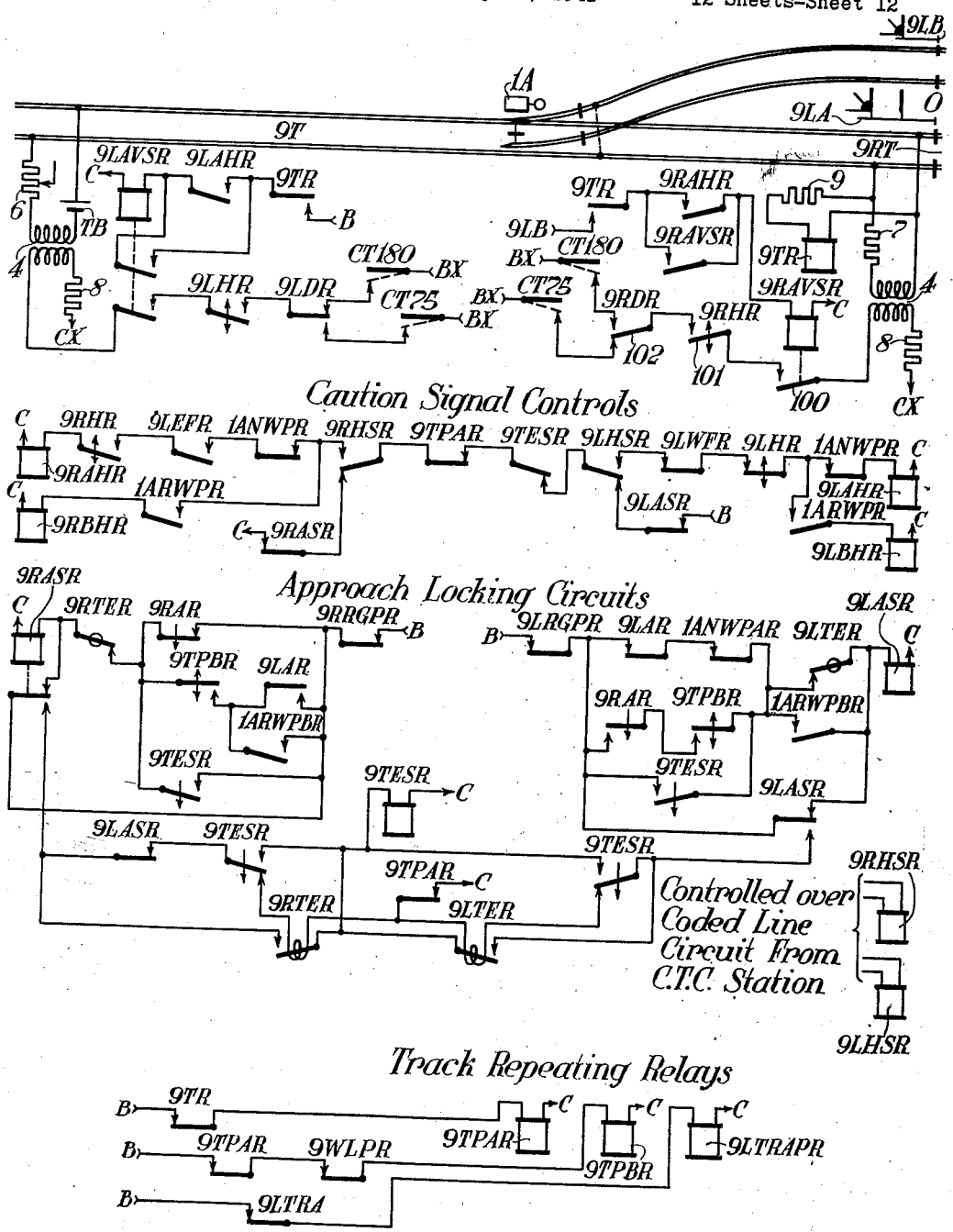

Since it has been assumed that the last authorized movement was westbound, the westbound traffic locking relay 9LWFR of Fig. 1k will be retained energized over a stick circuit which includes the back contact 53 of the eastbound traffic locking relay 9LEFR, wires 54 and 55, its own front contact 56, and wires 57 and 58. The westbound traffic locking relay 4RWFR at the other end will also be energized. The deenergization of the westbound traffic locking relay 9LWFR is effected by the energization of the eastbound traffic locking relay 9LEFR. This deenergization of 9LWFR must, however, not occur for successive westbound moves at a time when the track relay 9LTR is energized on code, after having been shunted by a westbound train and after that train has passed signal 11 and out of the track circuit 10T. Such deenergization is prevented through the provision of relay 9LHPR. This relay is energized over a front contact 57 of 9LFSAR, back point of contact 58 of 9LBSAR, front contact 59 of 9LWFR, and back point of contact 60 of 9LHR. This causes relay 9LHPR to become energized prior to the time relay 9LBSAR is energized (but during the time when relay 9LHR is still deenergized) so that the circuit which energizes relay 9LEFR is not established except at a time when 20 code is received by the track relay 9LTR. It is essential not to pick up relay 9LEFR following a westbound move because the opening of contact 53 would drop out relay 9LWFR which must remain energized to retain the established traffic direction (westbound). The signal 9L will remain at stop after a westbound move and will be cleared for a following train by the transmission of a suitable code which picks up relay 9LHSR and thereby energizes relay 9LAHR.

Since westbound signal 9L at location O is at stop, steps can be taken to set up the apparatus for an eastbound move and this operation will now be described. Looking first at the track circuits of Figs. 1e–1f, traffic locking relay 4RWFR (Fig. 1f) is energized because the last traffic movement established was westbound. The initial step in establishing eastbound traffic is made by energizing the lever controlled relay 4RHSS (Fig. 1e) with a movement of its associated traffic lever to the "R" position. Movement of this lever may either transmit a code over the C. T. C. line to operate relay 4RHSR, or it may operate this relay by direct wire connection as shown in Fig. 2. Since the apparatus which controls relay 4RHSR is well known, it has not been shown in detail. Pick-up of relay 4RHSR deenergizes relay 4RWFR due to opening of back contact 61 of relay 4RHSR (see Fig. 1f.) Since relay 4RWFR is released, 20 code will be fed to the track circuit 4RT in the following manner. Starting at one terminal BX of the alternating current source, the circuit may be traced through the front point of contact CT20 of the code transmitter for track circuit 4RT (not shown for this section but illustrated in Fig. 3), wire 62, back contact 63 of relay 4REFR, wire 64, and front contact 65 of relay 4RHSR (now energized), to the winding of the code feeding transformer 4, resistor 8, and the other terminal CX of the source. A shunt in parallel with the transformer winding is provided over the back point of contact CT20 and wires 66 and 67. Accordingly, during the "on" period of 20 code, alternating current is supplied to the input winding of transformer 4, and during the "off" period of this code, the input winding is shunted. Concurrently with the feeding of the alternating current during the "on" period of the 20 code, the secondary winding of the relay transformer 33 for the relay 4RTR is shunted by a second 20 code contact CT20 which operates in synchronism with the first contact, as indicated in Fig. 3. The shunt circuit for the relay transformer extends from one terminal of the transformer, over wire 68, front contact 69 of relay 4RHSR, wire 70, back contact 71 of relay 4REFR, wire 72, front point of contact CT20, and wire 73, to the other terminal of the transformer.

When the back point of contact CT20 closes during the "off" interval of 20 code, it establishes a circuit over which code may be received by the code following relay 4RTR. This circuit extends from wire 68, front contact 69 of relay 4RHSR, wire 70, back contact 71 of relay 4REFR, wire 72, and back point of contact CT20, to the relay rectifier 34 and relay 4RTR. However, there will not as yet be any proceed code present during the "off" interval of 20 code. The supply of this proceed code will be described more conveniently hereinafter. For the moment, it will be sufficient to say that until such time as a proceed code is present during the "off" intervals of the 20 code, this latter code will be fed in the eastbound direction, the track relay transformer 33 being short-circuited during the "on" periods, whereas during the "off" periods of 20 code, the track relay will be connected to receive proceed code if then present, the primary of the code feeding transformer 4 being short-circuited at this time.

The 20 code which is fed to the track circuit 4RT is relayed by the track relay 4RATR into the track circuit 13T over contact 45, in an obvious manner. At location J, the primary of the code feeding transformer 4 at the right-hand end of Fig. 1g is shunted because, since relays 12HPR, 12SR and 12BSAR are all deenergized, their respective back contacts 74, 75, and 76 are all closed. Relay 13TR will follow 20 code so that relay 13HR which is purposely designed to release on this code opens its front contact 77 and causes relay 13HPR to release. Relays 13FSAR and 13BSAR will, however, remain energized on 20 code so that relay 13SR will be prevented from picking up because of the open circuit at back contact 78 of 13FSAR.

Track circuit 12T will now also receive 20 code over front contact 79 of relay 13BSAR, back contact 80 of relay 13SR, and the back point of contact 59 of relay 13HPR. The alternate feeding of 20 code to the track circuit and connection of the track relay 12TR in energy receiving relation with the transformer 33 during the "off" intervals of 20 code is accomplished in the same manner as described above in connection with the track circuit 4RT so that these circuits can be readily traced and need not be described in detail.

Since relay 13HR is deenergized, signal 13 will be displaying its most restrictive indication. Relay 12ATR will follow the 20 code, relaying this code to the track circuit 11T for operating the track relay 11TR at location L, whereupon 20 code is supplied to track circuit 10T in a manner obvious from the previous description. Signal 11 will, of course, be displaying its most restrictive indication. The 20 code in track circuit 10T is received by track relay 10ATR and is relayed into the track circuit 9LT which is the last normally coded track circuit in the section which is controlled by the signal 4R.

With the reception of 20 code by the track relay 9LTR, relay 9LHR will release and since relays 9LFSAR and 9LBSAR will both remain energized on 20 code, relay 9LHPR will also be released. The release of relays 9LHR and 9LHPR establishes an obvious energizing circuit for relay 9LEFR. When relay 9LEFR picks up, the circuit which feeds the track relay 9LTR from its associated relay transformer 33 is interrupted and a shunt is placed on the secondary of this transformer. Concurrently, the shunt is removed from the code feeding transformer 4 at this location and a circuit is established for feeding 75 code to the track circuit 9LT.

It will be noted that the track circuit 9LT is now being fed 20 code from its left-hand or west end and 75 code from its right-hand or east end. Since relay 9LTR has ceased to operate, relays 9LFSAR and 9LBSAR will release, in turn. Following the release of these two relays, relay 9LEFR will be retained energized over its stick circuit so that 75 code will continue to be fed to the track circuit 9LT and a check will be maintained that signal 9R is at stop.

During the first "off" interval of 20 code, the 75 code will be relayed into the track circuit 10T by the code following relay 9LATR over its contacts 81. Relay 10TR will receive this code and will thereupon energize relays 10FSAR, 10BSAR, 10HR, and 10HPR, so that signal 10 will display the caution or approach indication. With the energization of relays 10HR and 10HPR, 180 code is fed to track circuit 11T over contact CT180, and front contacts 82 and 83 of these respective relays. Since the relay transformer 33 is shunted over front contacts 84 and 85 of relays 10HR and 10HPR, relay 11TR will be deenergized so that relays 11FSAR and 11BSAR will be released.

It will now be apparent that in a manner similar to that described for the track circuit 9LT, the track circuit 11T will be receiving 20 code from its west end and 180 code from its east end. During the first "off" interval of 20 code, the 180 code is relayed to the track circuit 12T wherein it energizes relay 12TR so that relays 12FSAR, 12BSAR, 12HR, 12HPR, and 12DR all become energized, thus causing signal 12 to display a clear or proceed indication.

In an analogous manner which will be clear from the previous description, as soon as relays 12HR and 12HPR pick up, 180 code will be fed to the track circuit 13T at its east end, 20 code being fed at its west end, whereupon during the first "off" interval of 20 code, the 180 code will be relayed into the track circuit 4RT over contact 86 of relay 13ATR. Relay 4RTR will now become energized, picking up relays 4RFSAR, 4RBSAR, 4RHR, 4RHPR, and 4RDR, in turn. With the energization of relays 4RHR and 4RHPR, since the traffic control relay 4RHSR is energized, an obvious circuit is completed for picking up the eastboard traffic locking relay 4REFR over the back contact 87 of relay 4RWFR, and front contacts 88, 89, and 90 of relays 4RHSR, 4RHR, and 4RHPR. The pick-up of relay 4REFR of Fig. 1f causes energization of relay 4RAHR of Fig. 1e over a circuit which includes the front contact 91 of relay 4LASR, back contacts 92 and 93 of relays 4LHSR and 4TES, and front contacts 94, 95, 96, 97, and 98 of relays 3TPAR, 4RHSR, 4REFR, 4RHR, and 3NWPAR, in series. Signal 4R will, accordingly, display its clear indication. It should be pointed out that once relay 4REFR is energized, relay 4RHPR will be energized (due to the inclusion of front contact 99 of relay 4REFR in the auxiliary pick-up circuit) following the energizatoin of 4RFSAR for all following train moves. This arrangement prevents the energization of the opposed traffic locking relay 4RWFR in the event that an eastbound train has vacated the block and has allowed relays 4RFSAR and 4RBSAR to pick up on the first code cycle. Provision for following moves in the intermediate blocks of the single track stretch is made in the usual and well-known manner through the use of the directional stick relays such as 10SR, 11SR, 12SR, and 13SR.

Referring for the moment to the track circuit 9T at the exit end for eastbound traffic, code is not applied to this track circuit until the eastbound train movement is completed, signal 9R cleared and the approach relay 9RAVSR energized. This approach relay will be energized only when the train accepts signal 9R and shunts the track circuit 9T. The code will be applied over the front contact 100 of relay 9RAVSR, front contact 101 of decoding relay 9RHR, and either the front or the back point of contact 102 of the 180 code decoding relay 9RDR depending on traffic conditions in advance. The code supply apparatus associated with the track circuit 9T in advance of the absolute signal 9R is well known and is shown only in order to make the diclosure more complete.

The foregoing description makes clear the manner in which a traffic reversal from westbound to eastbound is accomplished by energizing the code controlled HSR relay (4RHSR) at the entrance end of the single track stretch. It is evident that in a similar manner a traffic reversal from eastbound to westbound can be accomplished by energizing the code controlled traffic direction relay 9LHSR so as to clear signal 9L. The traffic direction relay 9RHSR would be used for establishing eastbound traffic beyond location O. Similarly, relay 2LHSR would be used for establishing westbound traffic to the left of location E.

It will be apparent from the previous description, in conjunction with the circuits shown in the drawings, that traffic between signals 2R and 4L on the passing siding portion of the main line extending between locations D—H is controlled in a similar manner, except that provision is made for preventing a move into the passing siding from interfering with traffic on the main track.

Having described the manner in which traffic direction is reversed when the single track stretch is unoccupied, I shall next describe those features of my invention which permit reversal of traffic before the "OS" section is clear. The desirability of a traffic reversal before a train is completely out of the section will be obvious from a consideration that in the system illustrated, an appreciable interval of time is required to complete the traffic reversal and to clear the entering signal. Even though this time interval is relatively short as compared with previous systems, prompt reversal of traffic direction is highly advantageous, especially when two trains are making a "meet," in order to avoid unnecessary stops.

I shall assume that a westbound train has passed signal 13; that the directional stick relay 13SR is energized; that track switch 3 is in its reverse position for movement into the passing siding; and that the lower arm of signal 4L is displaying a restrictive indication. When the westbound train accepts the indication of signal 4L and enters track circuit 3T, signal 4L will go to stop and an indication will be transmitted in the usual way to the C. T. C. operator who will then be permitted to send and store a code to restore switch 3 to its normal position and to clear signal 4RA. The actual reversal of the switch and clearing of this signal cannot, however, take place until after the track circuit 3T is vacated. Nevertheless, the traffic reversal operations may safely proceed from the moment that the rear end of the train passes out of the track circuit 4RT, which results in the prompt clearing of signal 4RA, once switch 3 has been restored.

The steps involved in the traffic reversal are as follows. When the code is stored for the purpose of restoring switch 3 and clearing signal 4RA, relay 4RHSR is energized. This causes 20 code to be fed to the track circuit 4RT in the manner previously described, but as long as the rear of the train is in this track circuit, this code is shunted and does not reach the track relay 13TR. After the track circuit 4RT is vacated, relay 13TR will receive the 20 code so that relays 13FSAR and 13BSAR will become energized. With the energization of relay 13BSAR, the directional stick relay 13SR will be released and 20 code will be fed to the track circuit 12T. From this point on, the operation of relaying the 20 code to the remaining track circuits and transmitting a proceed code back to the initial location is the same as previously described.

Upon completion of the traffic reversal operation (which may take place before the train has passed out of the track circuit 3T and before switch 3 has been restored to normal) relays 4RFSAR, 4RBSAR, 4RHR, 4RHPR, and 4RDR will all be energized. Relay 4REFR will, accordingly, be energized so that after the switch is restored, relay 4RAHR will pick up and will cause signal 4RA to display its clear indication. A similar set of operations would take place in the case of a "meet" arranged for the other end of the passing siding so that in either case a "non-stop meet" can readily be made.

From the foregoing it will be apparent that I have provided a comprehensive signaling system for a single track, two-direction stretch of railway and for a passing siding associated therewith, in which all control line wires are dispensed with except for the C. T. C. coded line circuit and a pair of approach locking wires for the passing siding section. The traffic direction is established by an operator through the medium of a suitable code which causes selective response of certain traffic direction control relays which I have designated generally as "HSR" relays. Once a given traffic direction is established, it is maintained until reversed by the operator and the usual frequency coded track circuits for wayside and cab signaling are effective for permitting a train movement through the section. Each train passing through the section provides its own following protection through the medium of the usual frequency code system of signaling. In reversing the traffic direction in either the single track stretch or the passing siding stretch, the operator sends out a code which operates the HSR relay at the new entrance end of the stretch in which the reversal is desired, whereupon current of 20 code is cascaded over the track circuits from this entrance end to the new exit end. This code sets the opposing signal at stop and causes proceed code to be cascaded back to the entrance end during the "off" intervals of the 20 code. The proceed code clears the intervening signals for the new direction and finally clears the entering signal so that traffic may proceed into the stretch. After a route is accepted, the established traffic direction is maintained against opposing moves and cannot be changed during occupancy. Traffic can, however, be reversed before the "OS" section is clear which permits the making of "non-stop meets" without delay to either train.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In combination with a stretch of track over which traffic may move in either direction, said stretch being divided into a plurality of track circuit sections, means for supplying current coded at a given frequency to the rails of said stretch when the stretch is unoccupied to thereby permit traffic to pass in one direction through said stretch, a traffic direction control relay, manually operable means for causing operation of said relay, means effective when said relay is operated for discontinuing the supply of said coded current and for supplying current coded at a frequency substantially lower than said given frequency to the rails at the entrance end of said stretch for the other direction to thereby initiate the reversal of traffic therein, a headblock signal for each end of said stretch, means for cascading said lower frequency code over said track circuit sections from said entrance end to the exit end to thereby set the opposing headblock signal at stop, means effective during the "off" intervals of said lower frequency code for supplying current coded at said given frequency to the rails at said exit end, and means for cascading said given frequency code over the track circuit sections to said entrance end to thereby clear the entrance headblock signal and so permit traffic to pass over said stretch in said other direction.

2. In combination with a stretch of track over which traffic may move in either direction, said stretch being divided into a plurality of track circuit sections, means for supplying current of a first code to the rails of said stretch when unoccupied to thereby permit traffic to pass in the normal direction through said stretch, manually operable traffic direction control means, means effective when said control means is operated for discontinuing said first code and cascading current of a second code from one end of said stretch in the reverse direction to the other end to check the unoccupied condition of said stretch, means effective during the "off" intervals of said second code for cascading said first code from the other end of said stretch in the normal direction over said sections, an entrance signal for traffic entering said stretch in the reverse direction, and means controlled by said first code effective when this code has been cascaded over said stretch for clearing said entrance signal to permit traffic to pass over said stretch in the reverse direction.

3. In combination with a stretch of track over which traffic may move in either direction, said stretch being divided into a plurality of track circuit sections, manually operable traffic direction control means, means effective when said control means is operated for cascading current of a checking code from one to the other end of said stretch over the track sections to thereby check the unoccupied condition of said stretch, means effective during the "off" intervals of said checking code for cascading current of a proceed code from said other end to said one end of the stretch over said track sections, an entrance signal for said one end of the stretch, and means effective when said proceed code is received at said one end for clearing said entrance signal.

4. In combination with a stretch of track over which traffic may move in either direction, said stretch being divided into a plurality of track circuit sections, a traffic direction control relay, means effective when said relay is operated for cascading current of a checking code from one to the other end of said stretch over the track sections to thereby check the unoccupied condition of said stretch, means effective when said checking code is received at said other end for cascading current of a proceed code from said other end to said one end of the stretch over said track sections, an entrance signal for said one end of the stretch, and means effective when said proceed code is received at said one end for clearing said entrance signal.

5. In combination with a stretch of track over which traffic may move in either direction, said stretch being divided into a plurality of track circuit sections, traffic direction control means effective when operated for cascading current of a relatively slow code from one to the other end of said stretch over said track sections to check the unoccupied condition of said stretch, means effective during the "off" intervals of said slow code for cascading current of a relatively fast code from said other end to said one end of the stretch over said track sections to establish clear traffic conditions for traffic movement in the direction from said one to said other end of the stretch, and means effective when said fast code is received at said one end for permitting entry of a train into said stretch at said one end thereof.

6. In combination with a stretch of track over which traffic may move in either direction, said stretch being divided into a plurality of track circuit sections, traffic direction control means, means effective when said control means is operated for cascading current of a checking code from one to the other end of said stretch over said track circuit sections, a traffic locking relay at said other end, means effective when said checking code is received at said other end for energizing said traffic locking relay, an entrance signal for said stretch at said one end, and means effective when said traffic locking relay is energized for cascading current of a proceed code during "off" intervals in said checking code from said other end over said track circuit sections to said one end for clearing said entrance signal.

7. In combination with a stretch of railway track over which traffic may move in either direction, said stretch being divided into a plurality of track circuit sections, eastbound and westbound traffic direction control means for establishing eastbound and westbound traffic conditions respectively in said stretch, means effective when said eastbound control means is operated for cascading current of a checking code from one to the other end of said stretch over said track circuit sections, an eastbound traffic locking relay at said other end controlled by said checking code to an energized position, means effective when said traffic locking relay is energized for cascading current of a proceed code during "off" intervals in said checking code from said other end over said track circuit sections to said one end to permit eastbound traffic to enter said stretch, a stick circuit for said traffic locking relay effective once said checking code is received at said other end, and a contact in said checking circuit which becomes opened to release said locking relay when said westbound direction control means is operated.

8. In combination with a stretch of track over which traffic may move in either direction, said stretch being divided into a plurality of track circuit sections, traffic direction control means, means effective when said control means is operated for cascading a checking code from one to the other end of said stretch over said track circuit sections, a traffic locking relay at said other end controlled by said checking code to an energized position, an opposing signal at said other end, means controlled by said traffic locking relay when energized for maintaining said opposing signal at stop, and means effective when said traffic relay is energized and said opposing signal is at stop for cascading a proceed code during "off" intervals of said checking code from said other end over said track circuit sections to said one end to thereby permit traffic to enter said stretch at said one end.

9. In combination with a stretch of track over which traffic may move in either direction said stretch being divided into a plurality of track circuit sections, an eastbound and a westbound traffic direction selecting relay, means effective when said westbound relay is energized for supplying a proceed code in the eastbound direction from one to the other end of said stretch to maintain westbound traffic conditions in said stretch, means effective when said eastbound relay is energized for discontinuing the supply of said proceed code and for cascading a checking code from said one to said other end of the stretch to initiate a traffic direction reversal, a traffic locking relay at said other end energized in response to the receipt of said checking code, the energizing circuit for said traffic locking relay including a back contact of said westbound relay, and means controlled by said traffic locking relay when energized for cascading a proceed code in the westbound direction from said other end to said one end of the stretch during "off" intervals in said checking code to thereby complete said traffic direction reversal.

10. In combination with a stretch of track over which traffic may move in either direction, said stretch being divided into a plurality of track circuit sections, an eastbound and a westbound traffic direction selecting relay, means effective when said westbound relay is energized for supplying a proceed code in a given direction from one to the other end of said stretch to maintain westbound traffic conditions in said stretch, means effective when said eastbound relay is energized for discontinuing the supply of said proceed code and for cascading a checking code from said one to said other end of the stretch to initiate a traffic direction reversal, a traffic locking relay at said other end energized in response to the receipt of said checking code, a first decoding relay at said other end energized in response to both said proceed and said checking codes, a second decoding relay at said other end energized in response to said proceed code but not said checking code; an energizing circuit for said traffic locking relay including a back contact of said westbound relay, a back contact of said second decoding relay and a front contact of said first decoding relay; and means controlled by said traffic locking relay when energized for completing said traffic direction reversal by cascading a proceed code in the reverse direction from said other end to said one end of the stretch during "off" intervals in said checking code.

11. In combination with a stretch of track over which traffic may move in either direction, said stretch being divided into a plurality of track circuit sections, an eastbound and a westbound traffic direction selecting relay, means effective when said westbound relay is energized for supplying a proceed code in a given direction from one to the other end of said stretch to maintain westbound traffic conditions in said stretch, means effective when said eastbound relay is energized for discontinuing the supply of said proceed code and for cascading a checking code from said one to said other end of the stretch to initiate a traffic direction reversal, a traffic locking relay at said other end energized in response to the receipt of said checking code, a first decoding relay at said other end energized in response to both said proceed and said checking codes, a second decoding relay at said other end energized in response to said proceed code but not said checking code; an energizing circuit for said traffic locking relay including a back contact of said westbound relay, a back contact of said second decoding relay and a front contact of said first decoding relay; a shunt path around said front contact including a front contact of said traffic locking relay to provide a stick circuit therefor, and means controlled by said traffic locking relay when energized for completing the traffic reversal by cascading a proceed code in the reverse direction from said other to said one end of the stretch during "off" intervals in said checking code.

12. In combination with a stretch of track over which traffic may move in either direction, said stretch being divided into a plurality of track circuit sections, means effective during westbound traffic conditions for supplying rail current of a proceed code in a given direction from one to the other end of said stretch, a westbound traffic locking relay at said other end which remains energized as long as westbound traffic conditions are maintained in said stretch to thereby permit westbound following train moves, said westbound traffic locking relay being initially picked up when said proceed code is received at said other end and remaining energized thereafter when said proceed code is discontinued, traffic direction reversal means at said one end effective when operated for discontinuing said proceed code and for cascading rail current of a checking code from said one to said other end of the stretch, and means effective when said checking code is received at said other end for releasing said westbound traffic locking relay and for cascading rail current of a proceed code in the reverse direction from said other to said one end of the stretch to thereby establish eastbound traffic conditions in said stretch.

13. In combination with a stretch of track over which traffic may move in either direction, said stretch being divided into a plurality of track circuit sections, means effective during westbound traffic conditions for supplying rail current of a proceed code in a given direction from one to the other end of said stretch, a westbound traffic locking relay at said other end which remains energized as long as westbound traffic conditions are maintained in said stretch to thereby permit westbound following train moves, said westbound traffic locking relay being initially picked up when said proceed code is received at said other end and remaining energized thereafter when said proceed code is discontinued, traffic direction reversal means at said one end effective when operated for discontinuing said proceed code and for cascading rail current of a checking code from said one to said other end of the stretch, an eastbound traffic locking relay energized in response to the receipt of said checking code at said other end, means effective when said eastbound traffic locking relay is energized for releasing said westbound traffic locking relay, and other means controlled by said eastbound traffic locking relay when energized for cascading rail current of a proceed code in the reverse direction from said other to said one end of the stretch to thereby establish eastbound traffic conditions in said stretch.

14. In combination with a stretch of track over which traffic may move in either direction, said stretch being divided into a plurality of track circuit sections, an eastbound traffic direction selector at one end of the stretch, a westbound traffic direction selector at the other end of the stretch, a first eastbound and a first westbound traffic locking relay at said one end, a second eastbound and a second westbound traffic locking relay at said other end, means effective when said westbound selector is operated for initiating the transmission of coded rail current over said sections to thereby energize said first and second westbound locking relays and so to establish westbound traffic conditions in said stretch, means effective when said eastbound selector is operated for releasing said first westbound relay and for cascading rail current of a checking code from said one to said other end for causing pick-up of said second eastbound relay, and means effective when said second eastbound relay picks up for releasing said second westbound relay and for cascading rail current of a proceed code from said other to said one end to thereby pick up said first eastbound relay and so to establish eastbound traffic conditions in said stretch.

15. In combination with a stretch of track over which traffic may move in either direction, said stretch being divided into a plurality of track circuit sections and having a passing siding at one end thereof with an "OS" track circuit section at said siding, traffic direction control means, means effective when said direction control means is operated for initiating a traffic reversal by supplying rail current of a checking code to the first track circuit section in the rear of said "OS" section, means effective when said first track circuit section is vacated by a train moving into said "OS" section for cascading said checking code over said sections to the other end of said stretch, means at said other end effective upon the receipt of said checking code for supplying rail current of a proceed code at said other end during "off" intervals of said checking code, means for cascading said proceed code over the intervening sections to said "OS" section whereby as soon as the train clears said "OS" section the proceed code will be effective therein, and means responsive to the receipt of the proceed code in said "OS" section for completing the traffic reversal for said stretch.

16. In combination with a stretch of track over which traffic may move in either direction, said stretch being divided into a plurality of track circuit sections and having a passing siding at one end thereof with an "OS" track circuit section at said siding, a traffic direction control relay and a traffic locking relay associated with said "OS" section, means including a front contact of said direction control relay and a back contact of said locking relay for initiating a traffic reversal by supplying rail current of a checking code to the first track circuit section in the rear of said "OS" section, means effective when said first track circuit section is vacated by a train moving into said "OS" section for cascading said checking code over said sections to the other end of said stretch, means at said other end effective upon the receipt of said checking code for supplying rail current of a proceed code at said other end during "off" intervals of said checking code, means for cascading said proceed code over said sections to said "OS" section, means responsive to the receipt of said proceed code in said first track circuit section for energizing said traffic locking relay, an entrance signal for traffic entering said "OS" section in the reverse direction, and means effective when the train clears said "OS" section and including a front contact of said direction control relay and a front contact of said traffic locking relay for clearing said entrance signal.

17. In combination with a stretch of track over which traffic may move in either direction, said stretch being divided into a plurality of track circuit sections and having a siding and a track switch therefor at each end of the stretch, means effective when traffic conditions have been established in a given direction over said stretch and said stretch is unoccupied for supplying a proceed code comprising alternating current impulses to the track at one end of said stretch, means including track relays responsive to said proceed code for cascading said code over the intervening track circuits to the other end of said stretch for clearing the entrance signal to permit traffic to enter said stretch, a normally energized neutral direct current detector track circuit comprising a detector track relay at one end and a source of direct current at the other end superimposed upon each track section of said stretch except the approach section at each end of the stretch, a polarized direct current approach track circuit comprising a polarized approach locking relay and a reversible source of direct current superimposed on each of said approach sections, means including contacts of said detector track relays effective when one of said detector track circuits is deenergized due to occupancy by a train for successively deenergizing the adjoining detector track circuits up to said approach track circuit in the established traffic direction, and means controlled by the detector relay for the track circuit adjoining said approach section for pole changing the polarized approach locking track relay of said adjoining approach section to thereby provide approach locking control of said track switch at the leaving end of the stretch for said given direction.

18. In combination with a stretch of track over which traffic may move in either direction, said stretch being divided into a plurality of track circuit sections and having a siding and a track switch therefor at each end of said stretch, means effective when traffic conditions have been established in a given direction over said stretch and said stretch is unoccupied for supplying a proceed code comprising alternating current impulses to the last track circuit at one end of said stretch, means including track relays responsive to said proceed code for cascading said code over the intervening track circuits to the other end of said stretch for clearing the entrance signal to permit traffic to enter said stretch, a polarized direct current approach track circuit comprising a polarized direct current approach locking track relay and a reversible source of direct current superimposed on the approach section adjoining each end of said stretch, and means responsive to occupancy by a train of a section between said approach sections for pole changing the approach locking relay for the approach section in advance to thereby provide approach locking control of said track switch at the leaving end of the stretch for said given direction.

19. In combination with a stretch of track over which traffic may move in either direction, said stretch being divided into a plurality of track circuit sections, traffic direction control means effective when operated for cascading rail current of a first code from the new entrance end of the stretch over the intervening track sections to the exit end to check the unoccupied condition of the stretch, and means effective when said first code is received at the exit end for cascading current of a second code from said exit end to said entrance end to thereby establish clear traffic conditions over said stretch in the direction from said entrance end to said exit end.

RALPH R. KEMMERER.